United States Patent
Oomura et al.

(10) Patent No.: US 7,174,733 B2
(45) Date of Patent: Feb. 13, 2007

(54) VEHICULAR AIR-CONDITIONER

(75) Inventors: Mitsuyo Oomura, Hekinan (JP); Toshinobu Homan, Oobu (JP)

(73) Assignee: Denso Corporation, Kariya (JP)

( * ) Notice: Subject to any disclaimer, the term of this patent is extended or adjusted under 35 U.S.C. 154(b) by 142 days.

(21) Appl. No.: 11/087,997

(22) Filed: Mar. 23, 2005

(65) Prior Publication Data

US 2005/0210897 A1    Sep. 29, 2005

(30) Foreign Application Priority Data

Mar. 26, 2004  (JP) .............................. 2004-092050

(51) Int. Cl.
F25D 17/06       (2006.01)
(52) U.S. Cl. .................. 62/186; 62/228.1; 310/54; 417/366
(58) Field of Classification Search ................ 62/186, 62/228.1, 229; 310/54, 57; 417/366–371
See application file for complete search history.

(56) References Cited

U.S. PATENT DOCUMENTS 3,127,754 A * 4/1964 Mobarry ...................... 62/158

4,669,279 A * 6/1987 Maeda et al. .................. 62/505
5,345,777 A * 9/1994 Sekino et al. .................. 62/244

FOREIGN PATENT DOCUMENTS

JP      2003-139069      5/2003

\* cited by examiner

*Primary Examiner*—William E. Tapolcai
(74) *Attorney, Agent, or Firm*—Harness, Dickey & Pierce, PLC (57) ABSTRACT

A vehicular air-conditioner wherein when a detected temperature of an inverter temperature sensor (22g) exceeds a predetermined value, an inverter (6) driving an electric motor (4) of an electric compressor (3) operates in an overheat protection mode for driving the electric motor by a heat protection speed different from the speed command value from the air-conditioning controller (20), secures the refrigerant flow rate, and cools itself. At this time, when a condenser fan (8) or vehicle compartment blower (14) is stopped by passenger operation or air-conditioning control, it is operated to promote the heat exchange at the heat exchangers, whereby it becomes possible to prevent an increase in the refrigerant pressure in the condenser (7) and prevent frost at the evaporator (11) and possible to protect against failure of function of the refrigeration cycle (2).

10 Claims, 10 Drawing Sheets

VEHICULAR AIR-CONDITIONER

BACKGROUND OF THE INVENTION

1. Field of the Invention

The present invention relates to a vehicular air-conditioner provided with a function of protection of a cooling system using an electric compressor.

2. Description of the Related Art

Known in the past has been a vehicular air-conditioner using an electric compressor, provided with a compressor body for suction and discharge of a refrigerant, a compression unit for compressing the refrigerant sucked into the compressor body, an electric motor for driving the compression unit, and a motor drive device for driving and controlling the electric motor, for a refrigeration cycle provided with a condenser, pressure reducer, evaporator, etc.

In such a vehicular air-conditioner, the motor drive device for driving and controlling the electric compressor becomes high in temperature due to the heat generated along with operation of the motor drive device itself and the heat exhausted from the engine and other heat sources. Due to this, a motor drive device provided with a semiconductor device is liable to stop functioning normally. To deal with this, one practice has been to arrange the motor drive device at a position enabling heat exchange with the refrigerant at the suction side of the electric compressor and raise the speed of the electric motor to increase the amount of suction of the refrigerant in the electric compressor and thereby cool the motor drive device when the temperature of the motor drive device exceeds a predetermined value so as to thereby protect the motor drive device against heat (for example, see Japanese Unexamined Patent Publication (Kokai) No. 2003-139069). However, the above related art did not consider protection of the motor drive device against heat when the electric motor of the electric compressor stopped, that is, when no refrigerant was flowing.

Further, when the electric motor was stopped or the cooling heat load was small, that is, when there was almost no heat exchange at the heat exchange means in the refrigeration cycle comprised by the condenser and evaporator, the following problems arose when trying to protect the motor drive device from heat by increasing the speed of the electric motor to forcibly make the refrigerant flow in the refrigeration cycle.

That is, if trying to supply high pressure refrigerant to a condenser not engaged in almost any heat exchange, the flow rate of the refrigerant at the condenser does not sufficiently rise, so the pressure at the refrigerant introduction port side of the condenser increases and the torque of the electric motor increases correspondingly. Due to this, the current of the electric motor also increases, so a rise in the internal temperature of the motor drive device is invited and a sufficient cooling effect by the refrigerant of the motor drive device can no longer be obtained. Further, if trying to supply high pressure refrigerant to the condenser, the pressure at the refrigerant introduction port side of the condenser excessively increases and the pressure is liable to damage the refrigerant flow passage and cause the refrigeration cycle to stop functioning.

On the other hand, even at the evaporator, since the amount of heat exchange is low, an increase in the flow rate of the refrigerant to the evaporator causes the evaporator to be excessively cooled and water of condensation of the condenser to freeze (forming frost). Due to this as well, the refrigeration cycle is liable to stop functioning.

SUMMARY OF THE INVENTION

An object of the present invention is to protect the refrigeration cycle when forcibly making refrigerant flow in a refrigeration cycle so as to protect a motor drive device of an electric compressor from heat.

In order to accomplish the above object, according to a first aspect of the present invention, there is provided a vehicular air-conditioner provided with: a refrigeration cycle (2) provided with an electric compressor (3) provided with a compression mechanism (5) for sucking in and compressing a refrigerant, an electric motor (4) for driving the compression mechanism, and a motor drive device (6) for controlling and driving the electric motor and arranged enabling cooling by the refrigerant and heat exchange means (7, 11) for heat exchange between the air and the refrigerant; blowing means (8, 14) for blowing the air into the heat exchange means; and an air-conditioning controller (20) for giving to the motor drive device a speed command value for instructing a speed of the electric motor or the stopping; the electric motor operating in an overheat protection mode where it operates by a heat protection speed set separate from the speed command value and sucks in and compresses the refrigerant when the motor drive device is in the overheated state so as to cool the motor drive device by the refrigerant; the air-conditioning controller setting the blowing means to an operating state when operating in the overheat protection mode when the blowing means is stopped.

To attain the above object, according to the present invention, there is provided a vehicular air-conditioner operating in an overheat protection mode where, when a motor drive device of an electric compressor is overheated, the electric compressor is driven independently by a heat protection speed separately set from the speed command value to the electric motor and thereby the motor drive device is cooled by a refrigerant flowing through a refrigeration cycle, wherein when operation in the overheat protection mode is started when blowing means for blowing air into heat exchange means for heat exchange between the refrigerant flowing through the refrigeration cycle and air are stopped, the blowing means are switched to the operating state, so it is possible to increase the amount of air blown to the heat exchange means to increase the amount of heat exchange at the heat exchange means and possible to protect the refrigeration cycle.

That is, it is possible to prevent damage to the refrigeration cycle due to the increase in refrigerant pressure in the heat exchange means at the high pressure part of the refrigeration cycle accompanying flow of refrigerant in the refrigeration cycle when the blowing means are stopped and the amounts of heat exchange of the heat exchange means are extremely small, freezing due to the drop in temperature in the heat exchange means of the low pressure part of the refrigeration cycle accompanying flow of refrigerant through the refrigeration cycle, and other failure of function of the refrigeration cycle.

According to a second aspect of the present invention, the heat exchange means is a condenser (7) for condensing the refrigerant discharged from the electric compressor, and the blowing means may be a condenser fan (8) for blowing the air into the condenser.

According to a third aspect of the present invention, the condenser fan is controlled in accordance with the speed command value given by the air-conditioning controller to the motor drive means and is stopped when the speed command value instructs stopping of the electric motor, and the condenser fan can change from the stopped state to an operating state when the electric motor is operating in the overheat protection mode. Due to this, when the operation of the overheat protection mode starts and the electric motor starts operating in the stopped state of the electric motor of the electric compressor, the condenser fan which had entered the stopped state in accordance with a speed command value to the electric motor can be made to enter the operating state along with operation in the overheat protection mode, so the condenser can exchange heat with the air blown by the condenser fan. Therefore the rise of the refrigerant pressure in the condenser can be prevented and thereby damage of the refrigeration cycle in the operation in the overheat protection mode of the electric compressor can be prevented and the refrigeration cycle can be protected.

According to a fourth aspect of the present invention, the heat exchange means is an evaporator (11) for discharging the refrigerant which the electric compressor sucks in, and the blowing means can be a vehicle compartment blower (14) for blowing the air to the evaporator.

According to a fifth aspect of the present invention, the air-conditioner is further provided with a flow rate switch (21d) for instructing the vehicle compartment blower to stop or operate, and the air-conditioning controller can change the vehicle compartment blower to an operating state when the flow rate switch instructs the stopping of the vehicle compartment blower and the electric motor is operating in an overheat protection mode. Due to this, when the operation of the overheat protection mode starts and the electric motor starts operating in the stopped state of the blower in the vehicle compartment due to the flow rate switch, the vehicle compartment blower can be switched to the operating state, so the evaporator can exchange heat with the air blown by the vehicle compartment blower and therefore it is possible to prevent overcooling due to the refrigerant of the evaporator and freezing of the water of condensation due to overcooling so as to protect it from failure of function of the refrigeration cycle.

According to a sixth aspect of the present invention, the overheat protection mode can be entered when the electric compressor is stopped and the overheated state occurs.

According to a seventh aspect of the present invention, the heat protection speed can be a preset fixed value.

According to an eighth aspect of the present invention, the overheat protection mode is entered when the electric compressor is operating in accordance with the speed command value from the air-conditioning controller and the overheated state occurs, and the heat protection speed can be set to a speed a predetermined amount larger than the speed command value.

According to a ninth aspect of the present invention, the air-conditioner is provided with drive device temperature detecting means for detecting the temperature of the motor drive device, the motor drive device judges whether it should operate in the overheat protection mode based on the temperature detected by the drive device temperature detecting means and, when judging that it should operate in the overheat protection mode, drives the electric motor by the heat protection speed irregardless of the speed command value from the air-conditioning controller, and sends an overheat protection flag to the air-conditioning controller, and the air-conditioning controller judges the operating state in the overheat protection mode based on the overheat protection mode flag and can set the blowing means to the operating state.

According to a tenth aspect of the present invention, the air-conditioning controller can judge that the operating state of the motor drive device is the overheat protection mode based on the temperature detected by the drive device temperature detecting means.

Incidentally, the reference numerals in parentheses, to denote the above means, are intended to show the relationship of the specific means which will be described later in an embodiment of the invention.

The present invention may be more fully understood from the description of preferred embodiments of the invention set forth below, together with the accompanying drawings.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
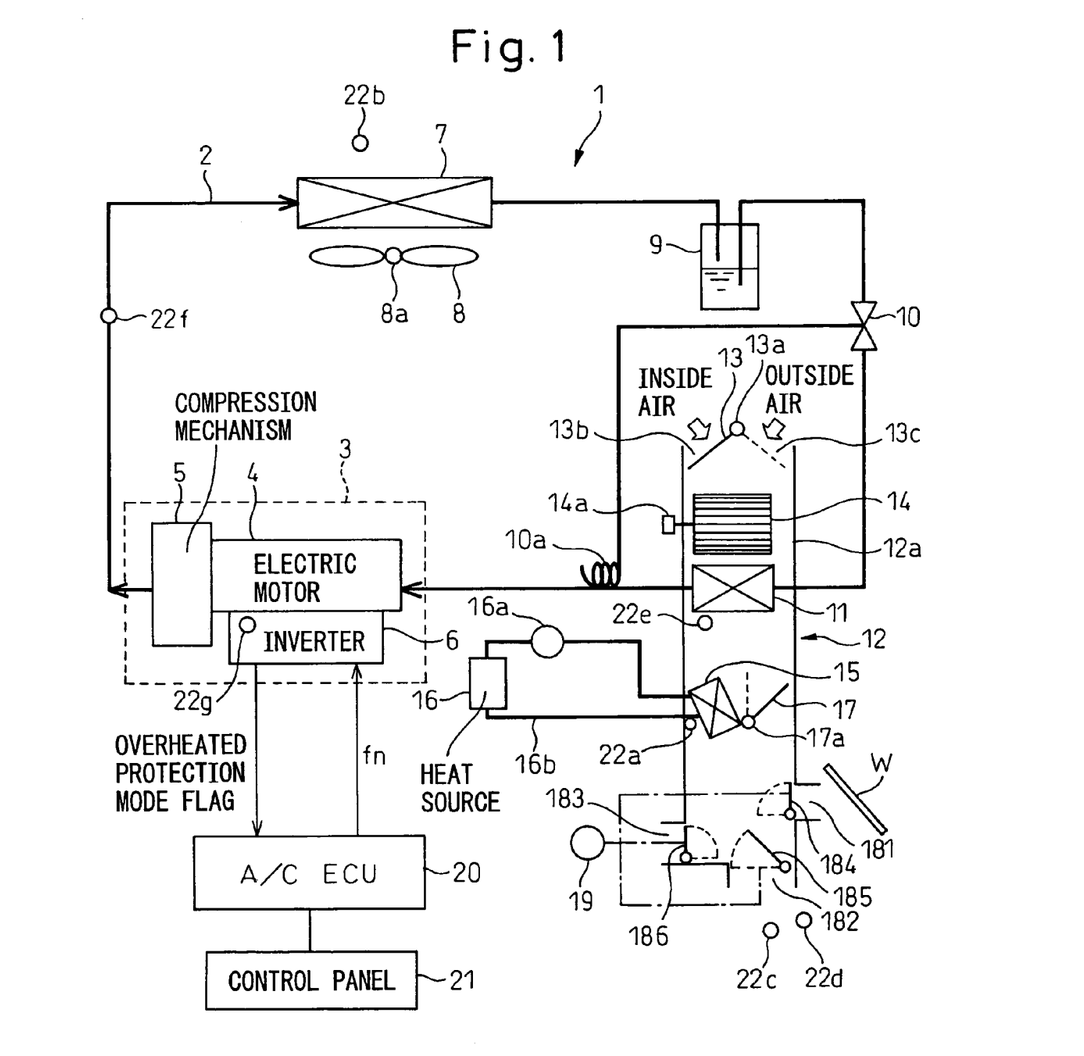
FIG. 1 is a view of the overall configuration of a vehicular air-conditioner of an embodiment of the present invention.

First, the first embodiment will be explained. FIG. 1 is a view of the overall configuration of a vehicular air-conditioner 1 of the present embodiment. The refrigeration cycle 2 of the vehicular air-conditioner 1 is provided with an electric compressor 3 for suction, compression, and discharge of a refrigerant. The electric compressor 3 is comprised of an electric motor 4 and a compression mechanism 5 driven by the electric motor 4. The electric motor 4 is specifically a three-phase AC motor, while the compression mechanism 5 is for example a known scroll compression mechanism. Due to this, the compression mechanism 5 can continuously change the discharge capacity in a range of 0 to 100% in accordance with the speed of the electric motor 4.

By variable control of the frequency of the three-phase AC power source given to the electric motor 4 by a motor drive device comprised of the inverter 6, it is possible to control the speed of the electric motor 4 to become the speed command value of the control output of the later explained air-conditioning controller and adjust the flow rate of refrigerant discharge of the electric compressor 3 in accordance with the level of the speed of the electric motor 4.

The high temperature, high pressure overheated gas refrigerant discharged from the electric compressor 3 flows into the condenser 7 where the refrigerant is exchanged in heat with the outside air blown in by a condenser fan 8 driven by a condenser fan motor 8a, cooled, and condensed. The refrigerant condensed by the condenser 7 next flows into a liquid receiver 9. In the liquid receiver 9, the gas and liquid of the refrigerant are separated. The excess refrigerant (liquid refrigerant) in the refrigeration cycle 2 is stored in the liquid receiver 9. Note that the refrigerant pipeline between the electric compressor 3 and the condenser 7 is provided with a pressure sensor 22f. The pressure sensor 22f detects the refrigerant pressure at the high pressure side of the refrigeration cycle 2.

The refrigerant from the liquid receiver 9 is reduced to a low pressure by an expansion valve (pressure reducing means) 10 and becomes a low pressure two-phase gas-liquid state. The expansion valve 10 is a temperature-type expansion valve having a temperature sensor 10a for sensing the temperature of the outlet refrigerant of the evaporator 11. The low pressure refrigerant from the expansion valve 10 flows into the evaporator (cooling use heat exchanger) 11. This evaporator 11 is placed inside an air-conditioning case 12a of an air-conditioning unit 12 of the vehicular air-conditioner 1. The low pressure refrigerant flowing into the evaporator 11 sucks heat from the air in the air-conditioning case 12a and generates heat. The outlet of the evaporator 11 is connected to the suction side of the electric compressor 3. The above components of the cycle form a closed circuit.

Note that the condenser 7 and the evaporator 11 of the refrigeration cycle both correspond to the heat exchange means of the present invention. Further, the condenser fan 8 corresponds to the blowing means for the condenser 7, while the vehicle compartment blower 14 corresponds to the blowing means for the evaporator 11.

The electric compressor 3 is placed in a not shown engine compartment. Further, the inverter 6 serving as the motor drive device for driving the electric motor 4 is integrally provided with the housing of the electric motor 4 in the example of FIG. 1.

Accordingly, the inverter 6 is exposed to the heat discharged from the heat source 16 comprised of the engine in the engine compartment, the exhaust manifold, the condenser 7, the condenser fan 8, etc. At the least, the casing of the inverter 6 reaches a high temperature of over 100° C. even during normal operation. Therefore, it is necessary to lower the temperature of the circuit elements of the inverter 6 down to a temperature enabling normal operation so as to improve the reliability of the inverter (motor drive device) 6.

Therefore, in this embodiment, the refrigerant flowing out from the evaporator 11 and sucked into the electric motor 4 of the electric compressor 3 first cools the electric motor 4 and inverter 6, then is sucked into and compressed by the compression mechanism 5 and is discharged to the condenser 7. Further, the inverter 6 is provided with an inverter temperature sensor 22g serving as the drive device temperature detecting means for detecting the temperature TIN of the circuit board of the inverter. As explained later, when the inverter temperature TIN becomes a predetermined temperature or more, the inverter 6 drives the electric motor 4 not by the speed of the speed command value from the air-conditioning controller 20 itself (target speed), but by a preset heat protection speed for cooling the inverter 6 (fixed value or speed command value+predetermined value α).

Note that the electric compressor 3 need not be an integral inverter type as explained above and may also be a separate inverter type, that is, a type where the inverter 6 is arranged separate from the electric motor 4 connected integrally with the compression mechanism 5. In this case, the inverter 6 can obtain the cooling effect due to the refrigerant by being arranged at a location enabling heat exchange with the refrigerant pipeline in the refrigerant suction part of the electric motor 4.

The vehicular air-conditioner 1 is provided with an air-conditioning unit 12. The air-conditioning unit 12 has a case 12a. The inside of the case 12 forms an air passage through which air is blown toward the vehicle compartment. The upstream-most part of the air passage of the case 12a is rotatably provided with an inside/outside air switch damper 13 serving as an inside/outside air switching means.

This inside/outside air switch damper 13 is driven by a servo motor 13a, so an inside air introduction mode for introducing inside air (air inside vehicle compartment) from an inside air introduction port 13b and an outside air introduction mode for introducing outside air (air outside vehicle compartment) from an outside air introduction port 13c are switched between.

The downstream side of the inside/outside air switch damper 13 is provided with an electric type vehicle compartment blower 14 for generating a flow of air toward the inside of the vehicle compartment. This vehicle compartment blower 14 is comprised of a centrifugal type blower fan driven by a blower motor 14a.

The downstream side of the vehicle compartment blower 14 is provided with an evaporator 11 for cooling the air flowing through the inside of the case 12a. The downstream side of the evaporator 11 is provided with a heater core 15 for heating the air flowing through the inside of the case 12a. The heater core 15 is supplied with warm water (engine cooling water) of the heat source 16 comprised of the vehicle engine circulated by a warm water pump 16a through the inside of a warm water circuit 16b. That is, the heater core 15 is a heating use heat exchanger for heating the air (cool air) after passing through the evaporator 11.

Note that the downstream side of the evaporator 11 is provided with an evaporator blown air temperature sensor 22e for detecting the blown air temperature of the evaporator 11, that is, the evaporator blown air temperature Te. Further, the warm water circuit 16b is provided with a water temperature sensor 22a for detecting the temperature Tw of the warm water (engine cooling water) in the warm water circuit 16b.

An air mix (A/M) damper 17 is rotatably arranged between the evaporator 11 and the heater core 15. The air mix damper 17 is driven by a servo motor 17a and can be continuously adjusted in rotational position (opening degree). The opening-degree of the air mix damper 17 is used to adjust the amount of air (amount of warm air) passing through the heater core 15 and the amount of air (amount of cool air) passing through a bypass at the side of the heater core 15 to bypass the heater core 15, whereby the temperature of the air blown into the vehicle compartment is adjusted.

The downstream-most part of the air passage of the air-conditioning case 12 is provided with a total of three types of blowing ports including defroster blowing ports 181 for blowing the air-conditioning air toward the front window glass W of the vehicle, front seat face blowing ports 182 for blowing air-conditioning air toward the faces of the front seat passengers, and front seat foot blowing ports 1833 for blowing air-conditioning air toward the feet of the front seat passengers.

The upstream parts of the blowing ports 181 to 183 are rotatably provided with defroster doors 184, front seat face doors 185, and front seat foot doors 186. These doors 184 to 186 are operated to open/close by a common servo motor 19 through a not shown link mechanism. Note that as other sensors, an outside air temperature sensor 22b for detecting the air temperature Tam outside the vehicle compartment (outside air temperature), an inside air temperature sensor 22c for detecting the air temperature Tr inside the vehicle compartment (inside air temperature), and a sunlight sensor 22d for detecting the amount of sunlight Ts entering the vehicle compartment are provided.

Figure 2:
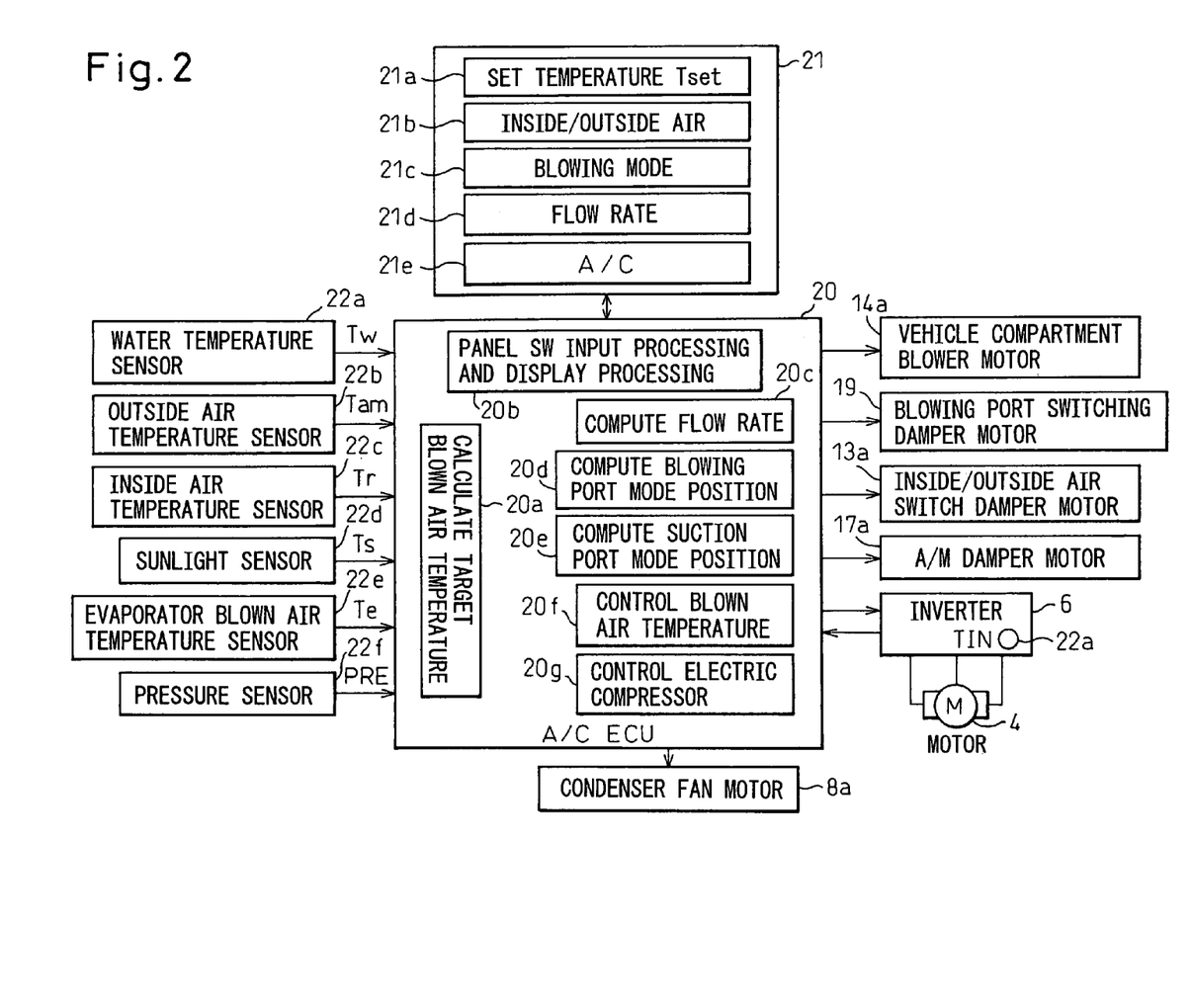
FIG. 2 is a block diagram showing in brief an electric controller of the embodiment.

Next, explaining in brief the electrical controller of the present embodiment by FIG. 2, the air-conditioning controller (A/C ECU) 20 is comprised of a known microcomputer including a CPU, ROM, RAM, etc. and its peripheral circuits. The air-conditioning controller 20 stores a control program for controlling the air-conditioning in the ROM and performs various operations and processing based on the control program. Note that the block diagram of FIG. 2 shows typical means for realizing the functions of the control processing executed by the air-conditioning controller 20 by blocks of notations 20a to 20g.

The input side of the air-conditioning controller 20 receives as input sensor detection signals from the group of sensors 22a to 22f and operation signals from an air-conditioning control panel 21.

The air-conditioning control panel 21 is arranged near the instrument panel (not shown) in front of the driver's seat in the vehicle compartment and has the following operation switches 21a to 21e operated by a passenger and a display (not shown) for displaying the operating states of the air-conditioning. The temperature setting switch 21a outputs a signal of a set temperature Tset in the vehicle compartment, while the inside/outside air switch 21b outputs a signal for manually setting the inside air mode and outside air mode of the inside/outside air switch door 13. The blowing mode switch 21 outputs a signal for manually setting as the blowing mode the known face mode, bilevel mode, foot mode, foot defroster mode, and defroster mode. The flow rate switch 21a outputs a signal for manually setting the on/off state and flow rate of the vehicle compartment blower 14.

An air-conditioning switch 21e switches between the operating state and stopped state of the electric compressor 3. When the air-conditioning switch 21e is set to the on position, the air-conditioning controller 20 outputs to the inverter 6 a speed command value in accordance with the target speed fn computed by the electric compressor controller 20g, whereby the electric motor 4 is driven in accordance with the speed command value and the electric compressor 3 enters the operating state. When the air-conditioning switch 21e is set to the off position, the electric compressor controller 20g outputs 0 (target speed fn=0) as the speed command to the inverter 6, whereby the air-conditioning controller 20 stops the rotation of the electric motor 4 and makes the discharge capacity of the electric compressor 3 substantially zero and the electric compressor 3 substantially enters the stopped state. The computation of this target speed fn will be explained later.

The output side of the air-conditioning controller 20 has servo motors 13a, 14a, 17a, and 19 forming the electrical drive means of the different equipment and a motor drive device of an electric compressor 3 comprised of an inverter 6 or condenser fan motor 8a etc. connected to it. The operations of these equipment are controlled by output signals of the air-conditioning controller 20.

Figure 3:
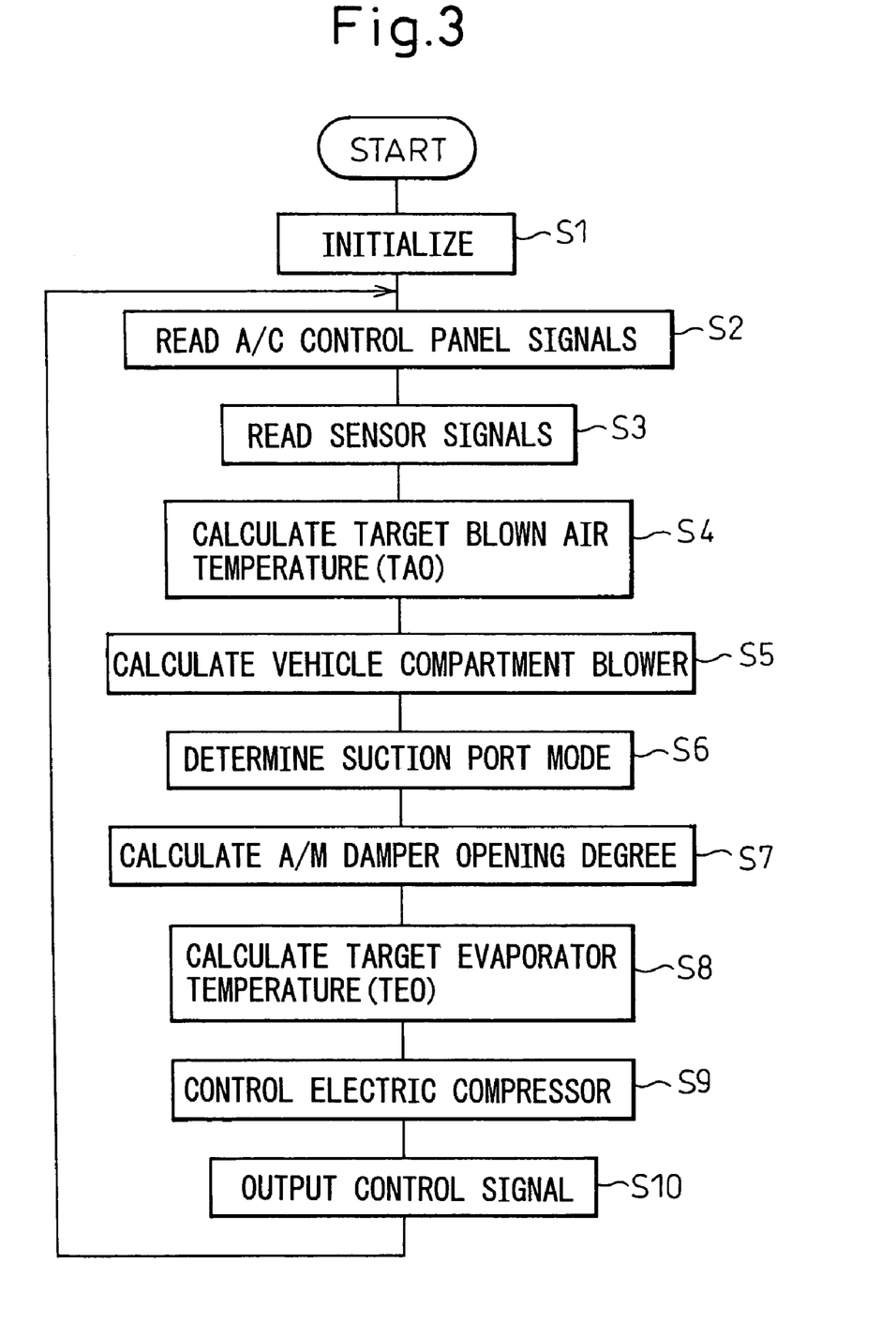
FIG. 3 is a flow chart of a main routine executed by an air-conditioning controller of the embodiment.

Next, the operation of the present embodiment of the above configuration will be explained. FIG. 3 is a flow chart of the main routine executed by the air-conditioning controller 20. This control routine starts when the ignition switch of the vehicle is turned to the on position.

First, at step S1, the flag, timer, etc. are initialized. At the next step S2, the operation signals of the operation switches 21a to 21e of the air-conditioning control panel 21 are read. At the next step S3, the detection signals of the ambient conditions of the vehicle are read from the sensors 22a to 22f etc.

Next, at step S4, the target blown air temperature TAO of the air-conditioning air blown into the vehicle compartment is calculated. This target blown air temperature TAO is the blown air temperature required for maintaining the inside of the vehicle compartment at a set temperature Tset of the temperature setting switch 21a and is the basic target value of the air-conditioning control. This target blown air temperature TAO is calculated by the following known formula (1) based on the set temperature Tset set by the temperature setting switch 21a of the air-conditioning control panel 21 and the inside air temperature Tr, the outside air temperature Tam, and the amount of sunlight Ts relating to the air-conditioning heat load.

$$TAO = Kset \cdot Tset - Kr \cdot Tr - Kam \cdot Tam - Ks \cdot Ts + C \quad (1)$$

where, Kset, Kr, Kam, and Ks are control gains and C is a correction constant

Figure 4A:
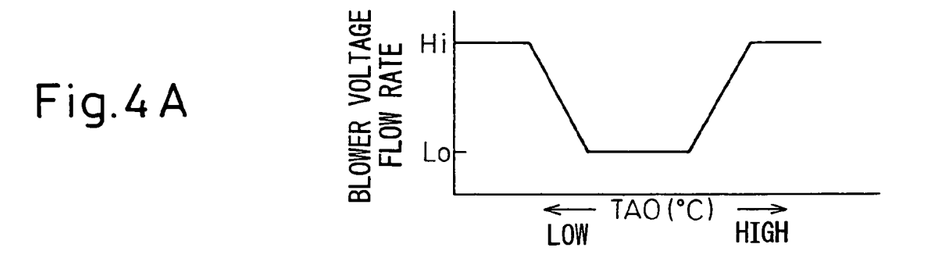
FIG. 4A to FIG. 4E are graphs of the operation of air-conditioning control in the embodiment.

Next, at step S5, the voltage applied to the blower motor 14a of the vehicle compartment blower 14, that is, the blower voltage, is calculated as shown in FIG. 4A based on the above target blown air temperature TAO. This blower pressure raises the speed of the blower motor 14a, that is, the flow rate of the vehicle compartment blown air, in the low temperature region and high temperature region of the target blown air temperature TAO and lowers the flow rate in the intermediate temperature region.

Figure 4B:
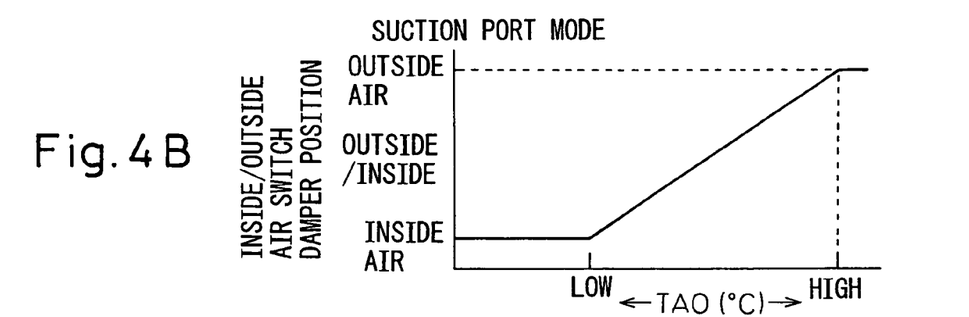
Figure 4C:
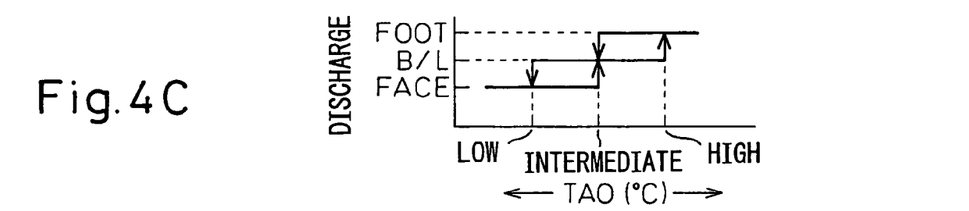

Next, at step S6, the inside/outside air suction mode (inside/outside air switch damper position) is determined as shown in FIG. 4B based on the target blown air temperature TAO. Next, at step S7, the blowing mode (blowing port damper position) is determined as shown in FIG. 4C based on the target blown air temperature TAO. The face mode of FIG. 4C is the mode for blowing air-conditioning air from the face blowing ports 182, the B/L (bilevel) mode is the mode for blowing air-conditioning air from both the face blowing ports 182 and the foot blowing ports 183, and the foot mode is the mode for blowing air-conditioning air from the foot blowing ports 183. At the time of the foot mode, it is also possible to blow out a small amount of air-conditioning air from the defroster blowing ports 181.

Next, at step S7, the target opening degree SW of the air mix damper 17 for making the temperature of the air-conditioning air blow out into the vehicle compartment the target blown air temperature TAO is calculated. Specifically, the target air mix damper opening degree SW is calculated by the following formula (2) based on the blown air temperature Te of the evaporator 11 (detected temperature of evaporator vent air sensor 22e), warm water temperature Tw of the heat core 15 (detected temperature of water temperature sensor 22a), and target blown air temperature TAO:

$$SW = \{(TAO - Te)/(Tw - Te)\} \cdot 100(\%) \quad (2)$$

Figure 4D:
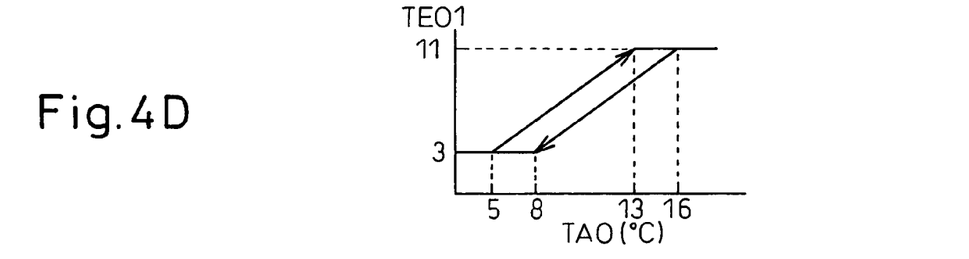
Figure 4E:
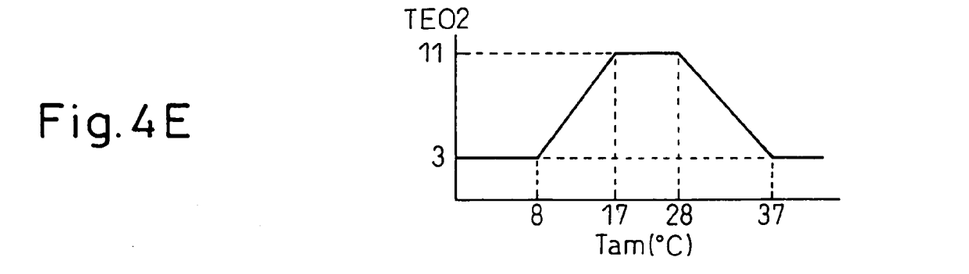

Next, at step S8, the target evaporator temperature TEO of the evaporator 11 is calculated. The method of calculation of this target evaporator temperature TEO is to determine as the target evaporator temperature TEO the lower of the first target evaporator temperature TEO1 determined as shown in FIG. 4D based on the target blown air temperature TAAO and the second target evaporator temperature TEO2 determined as shown in FIG. 4E based on the outside air temperature Tam.

That is, the first target evaporator temperature TEO1 is specifically determined so that it rises along with the rise of the target blown air temperature TAO. Further, when the outside air temperature Tam becomes an intermediate temperature region (for example, near 20° C.) or more, the need for the dehumidifying action for securing the defogging performance of window glass is reduced, so the second target evaporator temperature TEO2 is raised and the drive power of the electric compressor 3 is reduced to reduce the power of the vehicle engine. On the other hand, when in the low temperature region where the outside air temperature Tam becomes lower than the intermediate temperature region, the second target evaporator temperature TEO2 is lowered to secure a defogging performance of the window glass by the dehumidifying action of the evaporator 11. Next, at step S9, the control value of the electric compressor 3 is calculated. Details of step S9 will be explained later. Further, at step S10, control values are output to the equipment under control to drive the equipment under control.

Figure 5:
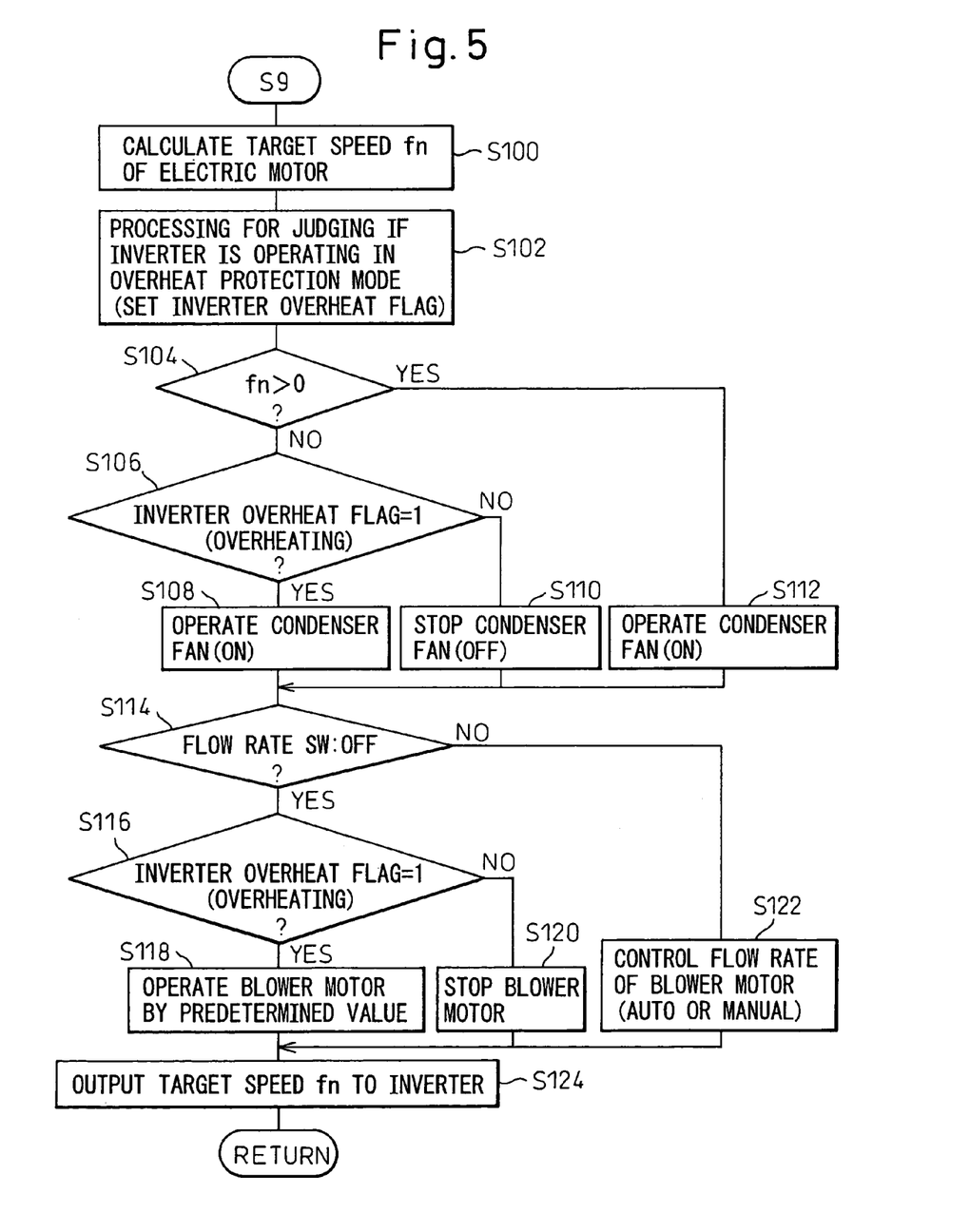
FIG. 5 is a flow chart of the overall control routine for the electric compressor of the embodiment.

FIG. 5 shows details of the control of the electric compressor at step S9. First, at step S100, the target speed fn of the electric motor 4 of the electric compressor 3 is calculated. Here, the method for calculation of this target speed fn is explained based on the processing routine of FIG. 6.

Figure 6:
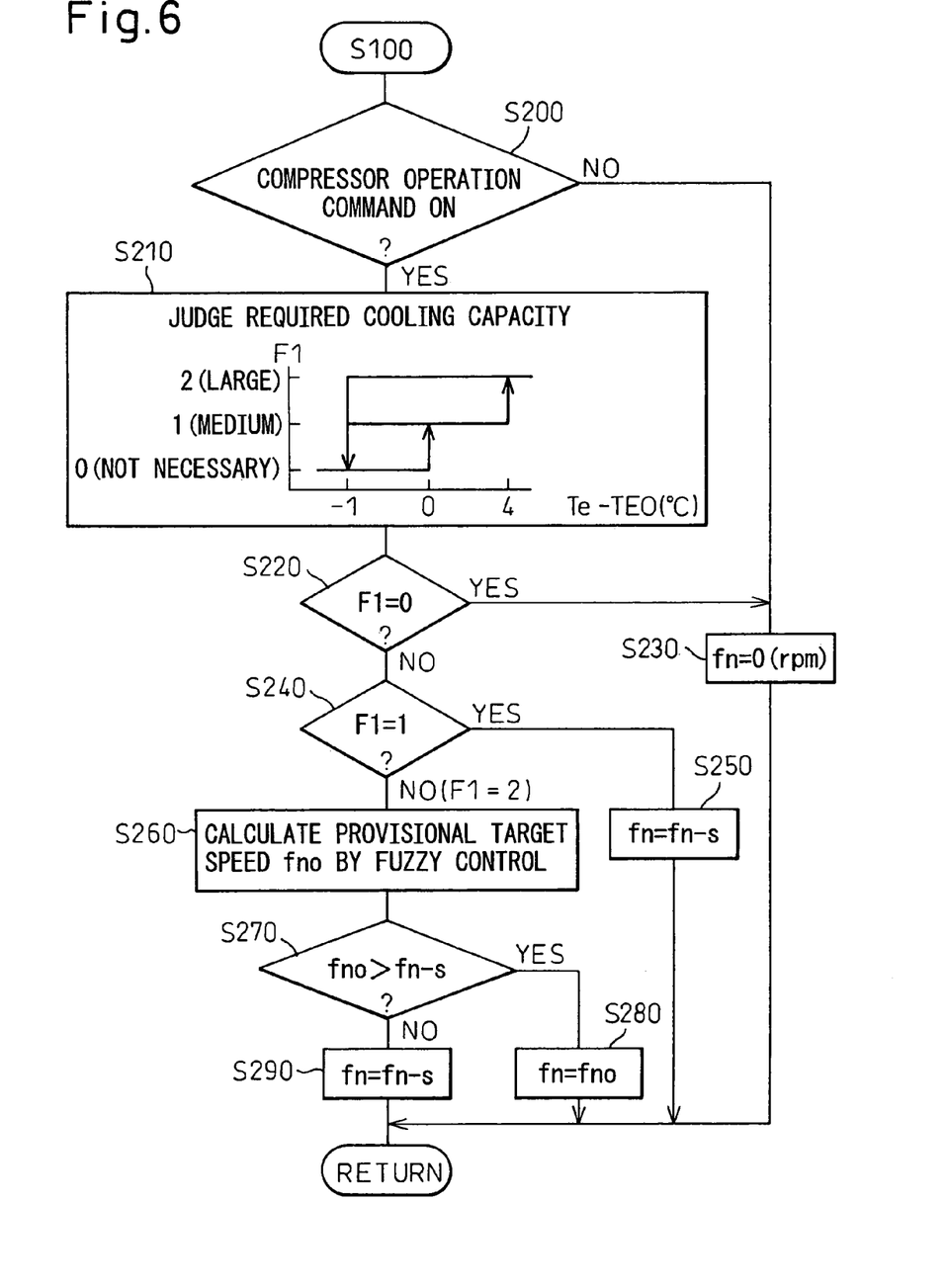
FIG. 6 is a flow chart of a routine for computing a target speed of the electric compressor.

At step S200, it is judged if the electric compressor operation command is the on state. This judgment is performed based on the on/off state of the air-conditioning switch 21e forming the compressor operation switch in the air-conditioning control panel 21. When the air-conditioning switch 21e is off, the electric compressor operation command is off. In this case, the routine proceeds to step S230, where the target speed fn of the electric motor 4 9 s made 0 (rpm), that is, the electric compressor 3 is stopped.

When the compressor operation command is the on state, at the next step S210, the required cooling performance F1 is judged. In this embodiment, this judgment is performed based on the difference (Te−TEO) between the actual evaporator blown air temperature Te detected by the evaporator blown air temperature sensor 22e and the target evaporator temperature TEO calculated at the above step S8.

That is, the difference (Te−TEO) is made the required cooling capacity F1=2 at 4° C. or more. Here, F1=2 indicates a large required cooling capacity. Further, once F1=2, it is maintained until the actual evaporator blown air temperature Te falls from the target evaporator temperature TEO and the difference (Te−TEO) becomes −1° C. Further, when the difference (Te−TEO) becomes 0° C. or more, the required cooling capacity F1 is made 1. Here, F1=1 indicates an intermediate required cooling capacity. The required cooling capacity F1=1 is maintained in the range where the difference (Te−TEO) is less than 4° C. and more than −1° C. The case of the required cooling capacity F1=2 and the case of the required cooling capacity F1=1 are maintained in predetermined ranges of difference in this way so as to prevent hunting of the speed control of the electric motor 4 and stabilize the speed control of the electric motor 4. Further, when the difference (Te−TEO) is −1° C. or less, the required cooling capacity F1 is made 0. This F1=0 indicates no cooling capacity is required.

At the next step S220, it is judged if the required cooling capacity F1 is 0. If F1=0, the routine proceeds to step S230, where the target speed fn of the electric motor 4 is made 0 rpm and the electric compressor 3 is stopped.

When F1 is not 0, the routine proceeds to step S240, where it is judged if F1 is 1. F1=1 shows the state where the required cooling capacity is "intermediate", so if F1=1, the routine proceeds to step S25, where the target speed fn of the electric motor 4 is made the predetermined intermediate speed fn-s, specifically 1500 rpm. Note that this predetermined intermediate speed fn-s (1500 rpm) is the predetermined intermediate region speed for the maximum usage speed of the electric motor 4 (for example, 7500 rpm).

When the judgment at step S240 is "no", that is, when the required cooling capacity is "large", the routine proceeds to step S260, where the provisional target speed fno corresponding to the required cooling capacity is calculated. The method of calculation of the provisional target speed fno at step S260 may be the method of calculation by fuzzy control known in Japanese Unexamined Patent Publication (Kokai) No. 8-2236.

Explaining the method of calculation by fuzzy control, the difference (Te−TEO) between the actual evaporator blown air temperature Te and the target evaporator temperature TEO is calculated, the rate of change of the difference (Te−TEO) is calculated, and the change Δfn of the target speed required for reducing the difference is calculated by fuzzy control based on the difference (Te−TEO) and the rate of change of difference. Further, a provisional target speed fno is calculated by the sum (fn+Δfn) of the change Δfn in the target speed and the previously calculated target speed fn.

Next, at step S270, it is judged if the provisional target speed fno is larger than the predetermined intermediate speed fn-s (1500 rpm). Normally, the judgment at step S270 becomes "yes", then at the next step S280, the target speed fn is made fno. That is, the provisional target speed fno calculated at step S260 is made the target speed fn as it is.

As opposed to this, when the judgment at step S270 becomes "no", at step S290, the rotational speed fn is made fn-s (1500 rpm). That is, the target speed fn is set to a predetermined intermediate speed fn-s (1500 rpm).

In this way, by deciding the target speed fn of the electric motor 4 (electric compressor 3) and controlling the speed of the electric compressor 3, when the required cooling capacity is the "intermediate" level, the speed of the electric compressor 3 is set to the predetermined speed fn-s (1500 rpm) (S250). Even if the speed of the electric compressor 3 is the predetermined intermediate speed fn-s, when the cooling heat load is small, the evaporator blown air temperature Te falls to lower than the target evaporator temperature TEO, F1 becomes 0, and the speed of the electric compressor 3 is made 0 (S230).

Therefore, when the required cooling capacity is the "large" level, a provisional target speed fno for reducing the difference (Te−TEO) between the actual evaporator blown air temperature Te and the target evaporator temperature TEO is calculated based on the difference. When this provisional target speed fno is larger than a predetermined intermediate speed fn-s, the provisional target speed fno is used as is as the target speed fn to operate the electric compressor 3. Due to this, when the required cooling capacity is the "large" level, it is possible to secure the flow rate of the refrigerant circulating inside the cycle necessary for securing the capacity. Note that when the cooling heat load is small, the speed of the electric compressor 3 intermittently changes between the predetermined intermediate speed fn-s and 0.

In this way, in this embodiment, the target speed fn of the electric motor 4 is given to the inverter 6 as the speed command value changing continuously from 0 (stopped state) to the maximum usage speed.

Figure 7:
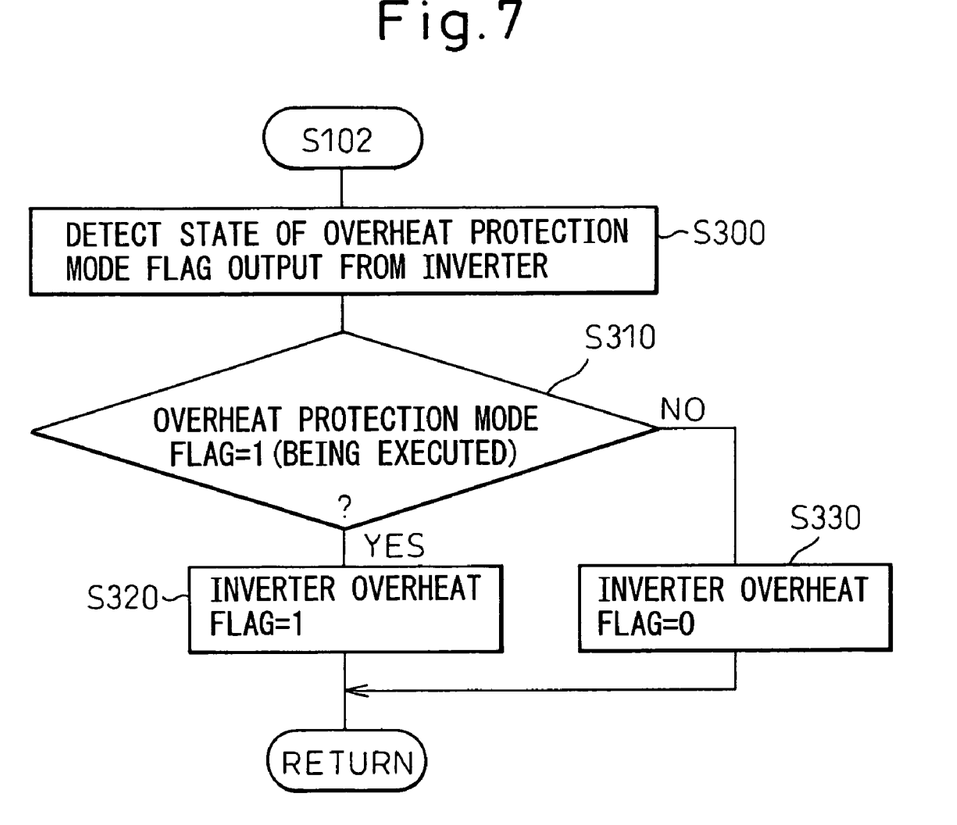
FIG. 7 is a flow chart of a routine for judging whether a motor drive device (inverter) is operating in an overheat protection mode in an air-conditioning controller of a first embodiment.

In this way, after the target speed fn of the electric motor 4 is calculated at step S100 of FIG. 5, the routine proceeds to step S102, wherein the inverter overheat flag is set in the air-conditioning controller 20 by the processing routine shown in FIG. 7 for the processing for judging if the inverter 6 is operating in the overheat protection mode.

Note that in this overheat protection mode, as explained later, to protect against overheating, the inverter 6 forcibly drives the electric compressor 3 by the heat protection speed set by itself rather than driving it by the speed command value in accordance with the target speed from the air-conditioning controller 20.

In FIG. 7, at step S300, the state of the overheat protection mode flag output from the inverter 6 is detected. At step S310, it is judged if the overheat protection mode flag is "1", that is, if the inverter 6 is operating in the overheat protection mode. When it is judged that this is so, at step S320, the air-conditioning controller 20 sets the inverter overheat flag at "1". When it is judged that the overheat protection mode flag is "0" at step S310, that is, the inverter 6 is not operating in the overheat protection mode, at step S330, the air-conditioning controller 20 sets the inverter overheat flag at "0".

Next, at step S104 of FIG. 5, it is judged if the target speed fn of the electric motor 4 calculated at step S100 is larger than a predetermined value (for example, 0). When the predetermined value is 0, it is judged if the target speed fn is 0 (that is, the speed command value for making the electric compressor 3 stop) or if the electric compressor 3 is operating at a target speed fn not 0. Note that when the target speed fn=0 is output from the air-conditioning controller 20 to the electric compressor 3, the condenser fan 8 is also made to stop.

When it is judged at step S104 that the target speed fn>0, the routine proceeds to step S112, where the condenser fan 8 is also made the operating state. That is, the condenser fan motor 8a driving the condenser fan 8 is controlled in accordance with the refrigerant pressure as determined by the pressure sensor 22f when the target speed fn to the electric compressor 3 is greater than 0, for example, by a well known method to a low speed at a predetermined first refrigerant pressure or less and to a high speed at a second refrigerant pressure greater than the first refrigerant pressure or more.

When the result of judgment at step S104 is "no", that is, when the target speed fn is 0, the electric compressor 3 is in a stopped state, so the routine proceeds to step S106. At step S106, it is judged if the inverter overheat flag set at step S102 is "1". When the inverter overheat flag is "1", that is, when the inverter 6 is operating in the overheat protection mode, the routine proceeds to step S108, where the condenser fan 8 is made the operating state. The speed of the condenser fan motor 8a in this case can be set in advance as a speed sufficient for preventing the rise of the refrigerant pressure in the evaporator 7 serving as the heat exchange means. Alternatively, it may also be made the low speed or high speed at the time of normal operation.

When it is judged at step S106 that the inverter overheat flag is "0", that is, the inverter 6 is not operating in the overheat protection mode, the electric compressor 3 is stopped and not overheated, so the electric compressor 3 is not forcibly driven. Therefore, the refrigerant pressure of the refrigeration cycle does not rise, so there is no increase in the refrigerant pressure at the evaporator 7, so at step S110, the condenser fan 8 is stopped.

After the operation of the condenser fan 8 finishes being instructed above, the routine proceeds to step S114, where it is judged if the flow rate switch 21d has been turned off by the passenger. When the result of judgment is "no", that is, when the flow rate switch 21d is set to "auto" or set to "manual" ("low" to "high"), the routine shifts to step S122, where the vehicle compartment blower motor 14a is controlled by the vehicle compartment blower level calculated at step S5 (FIG. 3) based on the setting of the flow rate switch 21d.

When the flow rate switch 21d is turned off, the routine proceeds to step S116 where, like step S106, it is judged if the inverter 6, that is, the electric compressor 3, is operating in the overheat protection mode.

When the inverter overheat flag is not "1", that is, it is judged that the inverter 6 (electric compressor 3) is not operating in the overheat protection mode, the electric compressor 3 is stopped and not in the overheated state, so the electric compressor 3 is not forcibly driven. Therefore, the coolant flow rate of the refrigeration cycle does not increase, so there is no danger of freezing in the evaporator 11, so at step S120, the vehicle compartment blower 14a is stopped.

When the inverter overheat flag is "1", that is, it is judged that the inverter 6 (electric compressor 3) is operating in the overheat protection mode, at step S118, the vehicle compartment blower motor 14a is driven at the predetermined blower level and the air is sent to the evaporator 11 serving as the heat exchange means. The speed of the blower motor 14a at this time (blower level) is set in advance as the speed giving an amount of blown air sufficient for heat exchange with the air in the evaporator 11. Note that the blower level may also be set to "low" or "high" in normal air-conditioning control (FIG. 4A).

Further, at step S124, a speed command value corresponding to the target speed fn calculated at step S100 is output and step S10 of the main routine (FIG. 3) is returned to.

Figure 8:
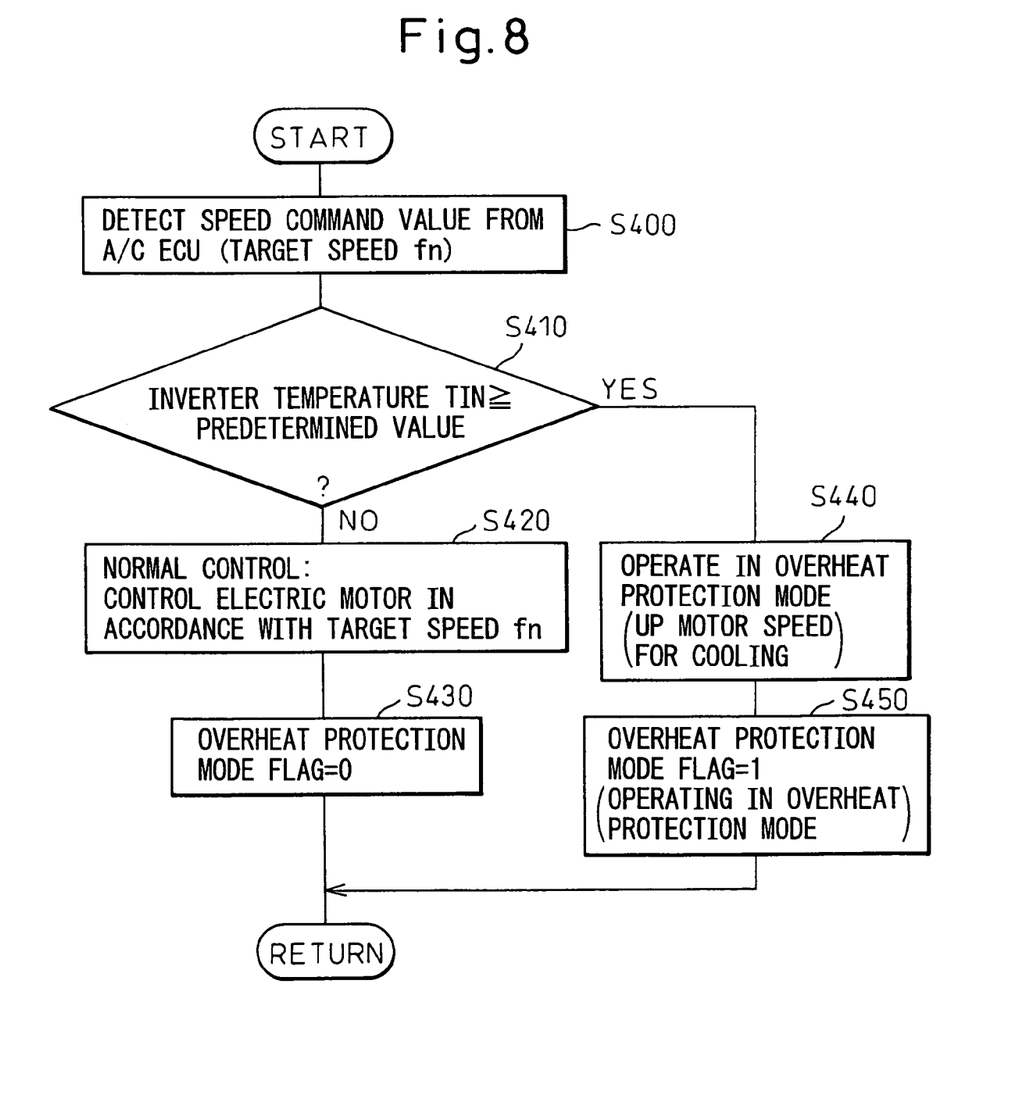
FIG. 8 is a flow chart of a control routine in a motor drive device (inverter) of the first embodiment.

Next, the operation in the inverter 6 will be explained using FIG. 8. The inverter 6 is comprised of a known microcomputer including a CPU, ROM, RAM, etc. and its peripheral circuits. FIG. 8 is a flow chart showing the control routine of the control program stored in the ROM of the inverter 6. The control routine starts the processing along with the ignition switch of the vehicle being turned on.

First, after initialization (not shown), at step S400, the speed command value from the air-conditioning controller 20 (target speed fn) is detected. The speed command value (target speed fn) is calculated at step S100, specifically the computation routine shown in FIG. 6.

Next, at step S410, whether the inverter 6 itself should operate in the overheat protection mode is judged by judging if the temperature TIN near the circuit board of the inverter 6 detected by the inverter temperature sensor 22g is at predetermined value or more. The predetermined value is set in accordance with the heat resistance temperature of the semiconductor circuit of the inverter 6.

When the inverter TIN is a relatively low temperature not over this predetermined value, the inverter 6 concludes that operation under the overheat protection mode is not necessary and, at step S420, controls the drive of the electric motor 4 in accordance with the speed command value (target speed fn) from the air-conditioning controller 20. This is the normal operating state of the electric compressor 3 at the time of air-conditioning control. Further, at step S430, the overheat protection mode flag is set to "0" and sent to the air-conditioning controller 20.

At step S410, when the inverter temperature TIN is a predetermined value or more and it is judged that the inverter 6 is in an overheated state, the routine proceeds to step S440, whereby the inverter 6 operates in the overheat protection mode.

That is, in the overheat protection mode at step S440, the inverter 6 drives the rotation of the electric motor 4 at the heat protection speed increased in speed by fn+α when the speed command value from the air-conditioning controller 20 (target speed fn) is not 0. This predetermined value α is a speed increase sufficient for cooling the inverter 6 in the overheated state and is preset.

Alternatively, when the speed command value from the air-conditioning controller 20 is 0, that is, the electric compressor 3 is in the stopped state, the inverter 6 operates the electric motor 4 at a heat protection speed set as a fixed value in advance (corresponding to increase in speed from the stopped state). This heat protection speed is a predetermined speed required for cooling the inverter 6 in the overheated state.

Due to this, in the overheat protection mode, the inverter 6 does not operate the electric motor 4 at the speed command value from the air-conditioning controller 20 (target speed fn) itself or stop it in accordance with the speed command value "0". The inverter 6 itself sets a heat protection speed of an extent enabling the inverter 6 to be cooled by the refrigerant and drives the rotation of the electric motor 4 by that heat protection speed so that the electric compressor 3 sucks in, compresses, and discharges the refrigerant for self-cooling of the inverter 6.

In this way, when shifting to the overheat protection mode, at step S450, the overheat protection mode flag is set to "1" and this is sent to the air-conditioning controller 20.

The inverter 6 repeatedly executes the above control routine. In this way, in the present embodiment, when the target speed fn of the electric motor 4 is 0 (S104), that is, the condenser fan 8 is in the stop command state, the inverter 6 is overheating, so operates in the overheat protection mode (S106), that is, when the electric compressor 3 is forcibly driven, the condenser fan 8 is driven (S108), air is sent to the condenser 7, heat exchange is promoted at the evaporator 7, and the coolant pressure to the condenser 7 can be reduced.

Due to this, it is possible to avoid the vicious cycle of an increase in discharge pressure of the electric compressor 3->increase in torque of the electric motor 4->increase in motor current->rise in temperature of inverter 6 for the coolant pressure in the refrigeration cycle rising along with operation of the electric compressor 3 in the overheat protection mode and thereby enable protection of the functions of the refrigeration cycle.

Further, it is possible to prevent the coolant pressure in the refrigeration cycle, which rises along with operation of the electric compressor 3 in the overheat protection mode, from excessively rising and the refrigeration cycle from being damaged and thereby protect the refrigeration cycle.

Further, in the present embodiment, when the flow rate switch 21d is set to the off position by manual operation (S114) and the inverter 6 is overheated in state and thereby operating in the overheat protection mode (S116), that is, the electric compressor 3 is forcibly driven, the vehicle compartment blower 14 is driven (S118), air is blown to the evaporator so that heat exchange of the evaporator 11 is promoted, and an excessive drop in the temperature of the evaporator 11 can be prevented. Due to this, along with operation of the overheat protection mode of the electric compressor 3, it is possible to prevent a drop in temperature at the evaporator 11 and freezing of the water of condensation accompanying this drop in temperature and thereby protect the refrigeration cycle.

Next, a second embodiment will be explained. In the first embodiment, the air-conditioning controller 20 judges if the inverter 6 is operating in an overheat protection mode or not by detecting an overheat protection flag output from the inverter 6, but in the second embodiment, the inverter 6 outputs a detection temperature TIN from the inverter temperature sensor 22g to the air-conditioning controller 20, while the air-conditioning controller 20 judges the operating state of the inverter 6 based on the inverter temperature TIN from the inverter 6.

Figure 9:
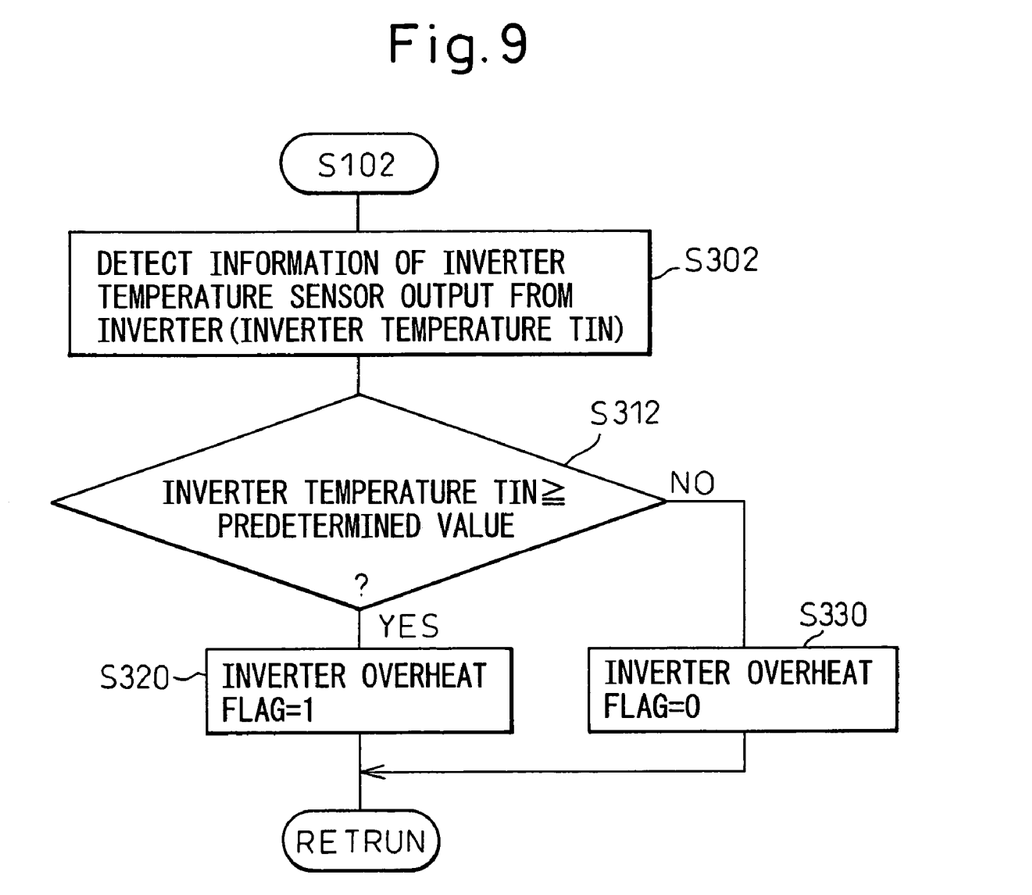
FIG. 9 is a flow chart of a routine for judging whether a motor drive device (inverter) is operating in an overheat protection mode in an air-conditioning controller of a second embodiment.
Figure 10:
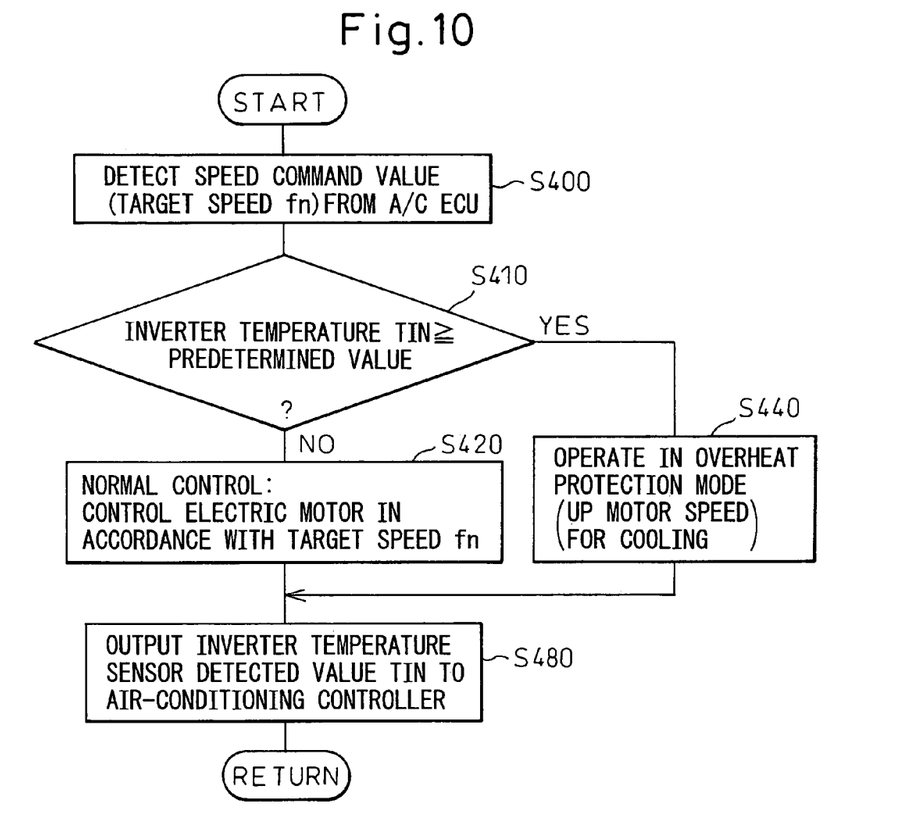
FIG. 10 is a flow chart of a control routine in a motor drive device (inverter) of the second embodiment.

FIG. 9 shows a routine for judgment of operation of the inverter 6 in the air-conditioning controller 20 of the second embodiment. FIG. 10 shows the control routine in the inverter 6 of the second embodiment. Steps of processing the same as in the operation judgment routine (FIG. 7) and control routine (FIG. 8) of the first embodiment are assigned the same notations and explanations are omitted. Further, the main routine in the air-conditioning controller 20 (FIG. 3) and the processing routine (FIG. 5) and target speed computation routine (FIG. 6) at step S9 are similar to the first embodiment, so explanations are omitted.

The air-conditioning controller 20 receives as input from the inverter 6 the inverter temperature TIN detected by the inverter temperature sensor 22g. At the next step S312, it judges if the inverter temperature TIN is a predetermined value or more. The predetermined value may be made the same predetermined value as when judging if the inverter 6 is in the overheated state (S410 of FIG. 8).

When the inverter temperature TIN is a predetermined value or more, the routine proceeds to step S320, where, like in the first embodiment, the inverter overheat flag is set to "1". Further, when the inverter temperature TIN is lower than the predetermined value, the routine proceeds to step S330, where, like in the first embodiment, the inverter overheat flag is set to "0".

On the other hand, in the control routine in the inverter 6 (FIG. 10), there is no need for sending the overheat protection mode flag to the air-conditioning controller 20 as in the first embodiment, the steps S430 and S450 in the processing routine of FIG. 8 in the first embodiment are bypassed, and, at step S480, the inverter temperature TIN detected by the inverter temperature sensor 22g is output to the air-conditioning controller 20.

The second embodiment also gives effects similar to those of the first embodiment.

Finally, other embodiments will be explained.

(1) In the first and second embodiment, it was judged whether to operate or stop the condenser fan 8 during operation of the overheat protection mode of the inverter 6 by whether the target speed fn of the electric motor 4 given to the inverter 6 was 0 or not (step S104 of FIG. 5), but the invention is not limited to this. That is, it is also possible to make the predetermined value for comparison with the target speed fn a relatively small value f0 (for example, f0=several 100 rpm).

That is, at such a small target speed f0, the compression mechanism 5 of the electric compressor 3 cannot operate due to an insufficient capability of the inverter 6, that is, the refrigeration cycle sometimes becomes the off state. In this case, at step S104, the target speed of the compared object is set not to 0, but a small finite value f0. Further, at this time, the condenser 8 also is set to the operating state when the target speed fn of the electric motor 4 is a finite value f0, not 0, or more.

Due to this, when the target speed fn of the electric motor 4 is not more than f0 (fn≦f0 (≠0)) and the inverter 6 (electric compressor 3) is forcibly driven in the overheat protection mode, by setting the condenser fan 8 to the operating state, it is possible to obtain the effect of protection of the refrigeration cycle in the same way as the above embodiments.

Figure 11:
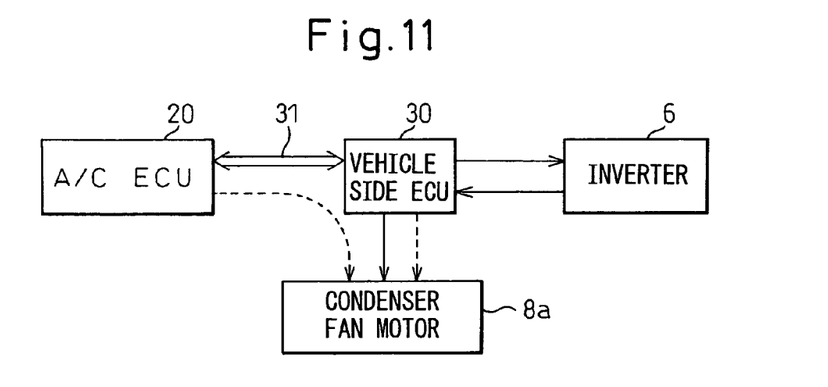
FIG. 11 is a view of another embodiment.

(2) In the first and second embodiments, the motor drive device of the electric compressor 3 comprised of the inverter 6 and the air-conditioning controller (A/C ECU) 20 were directly connected as shown in FIG. 1 and transferred signals with each other, but the invention is not limited to this and for example may be configured as shown in FIG. 11.

That is, in the example of FIG. 11, a vehicle side ECU 30 for controlling the vehicle engine, automatic transmission (both not shown), etc. and air-conditioning controller 20 are connected through the vehicle mounted LAN 31, and input and output signals of the air-conditioning controller 20 are transferred with the vehicle mounted LAN 31. Further, the inverter 6 of the electric compressor 3 is connected to the vehicle side ECU 30 and inputs and outputs a speed command value and overheat protection mode flag with the vehicle side ECU 30.

Further, the motor fan 8*a* of the condenser fan 8 is driven by the command signal from the vehicle side ECU 30. This configuration is used in a vehicle where an engine cooling radiator (cooling water heat exchanger) and air-conditioner condenser 7 are arranged side by side and an electric fan is provided for simultaneously blowing air to the heat exchangers (radiator and condenser).

That is, the electric fan (corresponding to condenser fan 8) is controlled based on both of the command value from the vehicle side ECU 30 controlling the engine (command value corresponding to cooling water temperature) and command value sent from the air-conditioning controller 20 controlling the air-conditioning to the vehicle mounted LAN 31 (command value corresponding to coolant pressure).

(3) In the first and second embodiments, the example was shown of the necessity of operation in the overheat protection mode being judged by the inverter 6 and the inverter 6 driving the electric motor 4 independently by a heat protection speed separate from the speed command from the air-conditioning controller 20, but the invention is not limited to this. For example, it is also possible to have the air-conditioning controller 20 judge the necessity of operation in the overheat protection mode based on the inverter temperature TIN and have the air-conditioning controller 20 switch between the speed command value of the electric compressor 3 at the time of normal air-conditioning and the heat protection speed under the overheat protection mode in accordance with need and output the result to the inverter 6.

While the invention has been described with reference to specific embodiments chosen for purpose of illustration, it should be apparent that numerous modifications could be made thereto by those skilled in the art without departing from the basic concept and scope of the invention.

The invention claimed is:

1. A vehicular air-conditioner provided with:
    a refrigeration cycle (2) provided with an electric compressor (3) provided with a compression mechanism (5) for sucking in and compressing a refrigerant, an electric motor (4) for driving said compression mechanism, and a motor drive device (6) for controlling and driving said electric motor and arranged enabling cooling by said refrigerant and heat exchange means (7, 11) for heat exchange between the air and said refrigerant;
    blowing means (8, 14) for blowing said air into said heat exchange means; and
    an air-conditioning controller (20) for giving to said motor drive device a speed command value for instructing a speed of said electric motor or the stopping;
    said electric motor operating in an overheat protection mode where it operates by a heat protection speed set separate from said speed command value and sucks in and compresses said refrigerant when said motor drive device is in the overheated state so as to cool said motor drive device by said refrigerant;
    said air-conditioning controller setting said blowing means to an operating state when operating in said overheat protection mode when said blowing means is stopped.

2. A vehicular air-conditioner as set forth in claim 1, wherein:
    said heat exchange means is a condenser (7) for condensing said refrigerant discharged from said electric compressor, and
    said blowing means is a condenser fan (8) for blowing said air into said condenser.

3. A vehicular air-conditioner as set forth in claim 2, wherein:
    said condenser fan is controlled in accordance with said speed command value given by said air-conditioning controller to said motor drive means and is stopped when said speed command value instructs stopping of said electric motor, and
    said condenser fan changes from said stopped state to an operating state when said electric motor is operating in said overheat protection mode.

4. A vehicular air-conditioner as set forth in claim 1, wherein:
    said heat exchange means is an evaporator (11) for discharging said refrigerant which said electric compressor sucks in, and
    said blowing means is a vehicle compartment blower (14) for blowing said air to said evaporator.

5. A vehicular air-conditioner as set forth in claim 4, wherein
    said air-conditioner is further provided with a flow rate switch (21*d*) for instructing said vehicle compartment blower to stop or operate, and
    said air-conditioning controller changes said vehicle compartment blower to an operating state when said flow rate switch instructs the stopping of said vehicle compartment blower and said electric motor is operating in an overheat protection mode.

6. A vehicular air-conditioner as set forth in claim 1, wherein said overheat protection mode is entered when said electric compressor is stopped and said overheated state occurs.

7. A vehicular air-conditioner as set forth in claim 6, wherein said heat protection speed is a preset fixed value.

8. A vehicular air-conditioner as set forth in claim 1, wherein:
    said overheat protection mode is entered when said electric compressor is operating in accordance with said speed command value from said air-conditioning controller and said overheated state occurs, and
    said heat protection speed is set to a speed a predetermined amount larger than said speed command value.

9. A vehicular air-conditioner as set forth in claim 1, wherein said air-conditioner is provided with drive device temperature detecting means for detecting the temperature of said motor drive device, said motor drive device judges whether it should operate in said overheat protection mode based on the temperature detected by said drive device temperature detecting means and, when judging that it should operate in said overheat protection mode, drives said electric motor by said heat protection speed irregardless of said speed command value from said air-conditioning controller, and sends an overheat protection flag to said air-conditioning controller, and said air-conditioning controller judges the operating state in said overheat protection mode based on said overheat protection mode flag and sets said blowing means to the operating state.

10. A vehicular air-conditioner as set forth in claim 1, wherein:

said air-conditioner is provided with a drive device temperature detecting means (22g) for detecting the temperature of said motor drive device, said motor drive device judges it should operate in said overheat protection mode based on the temperature detected by said drive device temperature detecting means and, when judging that it should operate in said overheat protection mode, drives said electric motor by said heat protection speed irregardless of said speed command value from said air-conditioning controller, and said air-conditioning controller judges that the operating state of said motor drive device is said overheat protection mode based on the temperature detected by said drive device temperature detecting means and sets said blowing means to the operating state.

* * * * *